United States Patent
Liu et al.

(10) Patent No.: US 8,902,186 B2
(45) Date of Patent: Dec. 2, 2014

(54) TOUCH DISPLAY APPARATUS AND TOUCH POSITION MAPPING METHOD THEREOF

(71) Applicant: Himax Technologies Limited, Tainan (TW)

(72) Inventors: Jui-Ming Liu, Tainan (TW); Li-Lin Liu, Tainan (TW); Chung-Wen Chang, Tainan (TW); Shen-Feng Tai, Tainan (TW)

(73) Assignee: Himax Technologies Limited, Tainan (TW)

( * ) Notice: Subject to any disclaimer, the term of this patent is extended or adjusted under 35 U.S.C. 154(b) by 156 days.

(21) Appl. No.: 13/685,663

(22) Filed: Nov. 26, 2012

(65) Prior Publication Data
US 2014/0145964 A1    May 29, 2014

(51) Int. Cl.
*G06F 3/041* (2006.01)
(52) U.S. Cl.
CPC ..................................... *G06F 3/041* (2013.01)
USPC .......................................................... 345/173
(58) Field of Classification Search
CPC ..... G06F 3/041; G06F 3/0412; G06F 3/0416; G06F 3/0488
USPC ..................... 345/173, 174; 178/18.01, 18.03
See application file for complete search history.

(56) References Cited

U.S. PATENT DOCUMENTS

| | | | |
|---|---|---|---|
| 2011/0205169 A1* | 8/2011 | Yasutake | 345/173 |
| 2012/0235936 A1* | 9/2012 | Yeh et al. | 345/173 |

FOREIGN PATENT DOCUMENTS

| | | |
|---|---|---|
| TW | 201001258 | 1/2010 |
| TW | 201007516 | 2/2010 |
| TW | 201232350 | 8/2012 |
| TW | 201232363 | 8/2012 |

OTHER PUBLICATIONS

"Office Action of Taiwan Counterpart Application", issued on Sep. 10, 2014, pp. 1-6, in which the listed references were cited.

* cited by examiner

*Primary Examiner* — Regina Liang
(74) *Attorney, Agent, or Firm* — J.C. Patents

(57) ABSTRACT

A touch display apparatus and a touch position mapping method thereof are provided, by mapping a touch position detected by a touch module to a display area of a display module according to one fitting function, so that a touch position on the display area of the display module may be determined according to a mapping result.

8 Claims, 3 Drawing Sheets

TOUCH DISPLAY APPARATUS AND TOUCH POSITION MAPPING METHOD THEREOF

BACKGROUND OF THE INVENTION

1. Field of the Invention

The invention relates to a touch display apparatus and a touch position mapping method thereof. More particularly, the invention relates to a touch display apparatus employing one fitting function and a touch position mapping method of said touch display apparatus.

2. Description of Related Art

With an advancement of semiconductor technologies, human beings by degrees tend to rely on electronic products. The electronic products such as mobile phones, handheld personal computers (PCs), personal digital assistants (PDAs) and smart phones have pervaded everywhere in our daily life. Some of the electronic products may integrate touch panels into display panels, so as to enable users to have relatively large display frames in a simple operation mode in consideration of restricted volumes of the miniature electronic products. The integration of the touch panels and the display panels results in a formation of a touch display panel. The touch display panel combines displaying function of a display panel and operating convenience of a touch panel. Therefore, the touch display panel has gradually become a standard equipment of many electronic devices.

Generally, a touch display panel includes a display panel and a touch panel. By disposing the display panel to overlap with the touch panel, based on the touch position detected by the touch panel, the display panel may display a corresponding screen or an electronic device using the touch display panel may execute a corresponding operation. FIG. 1 is an overlapping schematic view of a display panel and a touch panel. As shown in FIG. 1, a size of a display panel 102 is generally smaller than a size of the touch panel 104. However, a border area of the touch panel 104 does not include a touch-sensing functionality. Therefore, a touch area of the touch panel 104 is practically smaller than the area of the touch panel 102, namely, a touch area of the touch panel may not cover the entire area of the display panel 102.

Generally, the touch area on the touch display panel may be divided into a center touch area where most of touch operations from users are performed, and a border touch area where relatively fewer operations are performed. While having more error tolerance to the border touch area, the system manufacturer demands a higher accuracy in manufacturing the center touch area.

Since a relative relation of a touch-sensing unit of the touch panel 104 and a pixel unit of the display panel 102 is not a one-to-one correspondence, and the touch area of the touch panel 104 is smaller than the display area of the display area 102, such that computations may be required in order to match the touch position on the touch panel 104 to a corresponding position on the display panel 102. In conventional art, the mapping of the touch positions of the touch panel and the display panel is usually performed by using two independent functions, in which the two functions respectively define a portion of position range for position-mapping. Although said method may acquire a correct relative relation from most of the touch area, when the touch position falls on a boundary of the position ranges defined by the two function, the touch position of the touch panel 104 may not be accurately mapped to a corresponding position on the display panel 102, thereby affecting operative quality of the touch display panel.

SUMMARY OF THE INVENTION

The invention provides a touch position mapping method of a touch display apparatus, which is adapted for mapping a touch position detected by a touch module to a touch position on a display area of a display module.

The invention provides a touch display apparatus, including a touch module, a display module, a storage unit and a control unit. In which the display module is disposed to overlap with the touch module. The storage unit is stored with at least a fitting function. The control unit is coupled to the touch module, the display module and the storage unit, and configured for mapping a touch position detected by the touch module to a display area of the display module according to one fitting function and determining a touch position on the display area of the display module according to a mapping result.

According to an embodiment of the invention, the fitting function is a univariate cubic polynomial function.

In an embodiment of the invention, the storage unit stores a first fitting function and a second fitting function, the control unit maps a touch position on horizontal axis orientation detected by the touch module to the display area of the display module according to the first fitting function and maps a touch position on vertical axis orientation detected by the touch module to the display area of the display module according to the second fitting function, thereby determining the touch position on the display area of the display module.

The invention further provides a touch position mapping method of a touch display apparatus, which is adapted for mapping a touch position detected by a touch module to a touch position on a display area of a display module, the touch position mapping method of the touch display apparatus includes the following steps. Mapping a touch position on horizontal axis orientation detected by the touch module to the display area of the display module according to the first fitting function. Mapping a touch position on vertical axis orientation detected by the touch module to the display area of the display module according to the second fitting function. Determining the touch position on the display area of the display module according to a mapping result of the first fitting function and the second fitting function.

According to an embodiment of the invention, the first fitting function and the second fitting function are univariate cubic polynomial functions.

In one embodiment of the present invention, a touch area of the touch module is smaller than the display area of the display module.

In view of above, by mapping of the touch position according to one fitting function, the invention may accurately map the touch position detected by the touch module to the touch position on the display area of the display module.

To make the above features and advantages of the invention more comprehensible, several embodiments accompanied with drawings are described in detail as follows.

DESCRIPTION OF THE EMBODIMENTS

Figure 1:
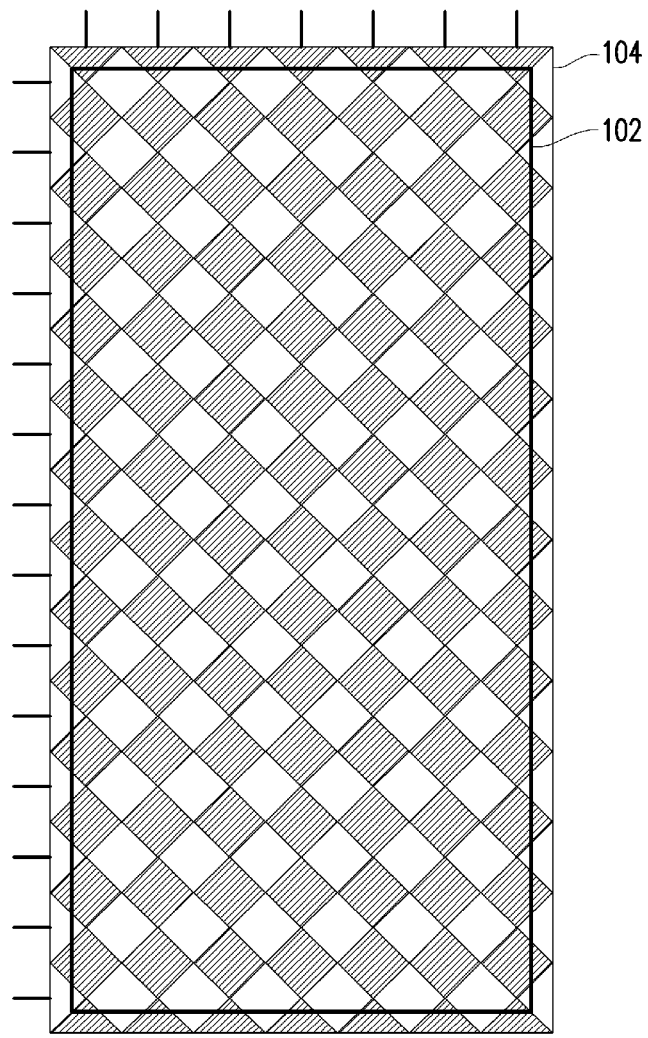
FIG. 1 is an overlapping schematic view of a display panel and a touch panel.
Figure 2:
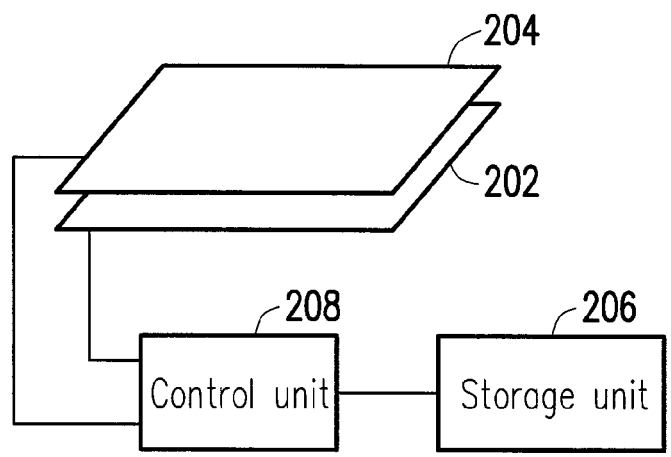
FIG. 2 is a schematic view of a touch display apparatus according to an embodiment of the invention.

FIG. 2 is a schematic view of a touch display apparatus according to an embodiment of the invention. Referring to FIG. 2, a touch display apparatus 200 includes a touch module 204, a display module 206, a storage unit 206 and a control unit 208. In which, the touch module 202 is disposed to overlap with the display module 204, and the control unit 208 is coupled to the touch module 202, the display module 204 and the storage module 206. Generally, a touch area of the touch module 202 is slightly smaller than a display area of the display module 204, namely, when the touch area of the touch module 202 is projected to the display area of the display module 204, in which a portion of the display area is not corresponding to any touch area and no touch operation may be performed on said portion of the display area. Therefore, a method of position-mapping is required to map the touch position detected by the touch module to the display area of the display module 204, so that each position on the display area of the display module may have a corresponding touch-sensing functionality.

The storage unit 206 is stored with at least a fitting function being used for mapping the touch position detected by the touch module 202 to the display area of the display module 204, in which the fitting function may be, for example, a univariate cubic polynomial function, but the invention is not limited thereto. The control unit 208 may map the touch position detected by the touch module 202 to the display area of the display module 204 according to one fitting function, and a touch position on the display area of the display module 204 may be determined according to a mapping result. Accordingly, the display module 204 may display a corresponding screen, or an electronic device using the touch display apparatus 200 may execute a corresponding operation. In comparing to the mapping method which uses two ore more transfer functions in conventional art, the method of mapping the positions using one fitting function may reduce the degree of mapping error between a mapped position and an actual touch position, especially when the touch position falls on a boundary of the mapping areas defined by different transfer functions.

More specifically, firstly, the control unit 208 may perform a touch position mapping on horizontal axis orientation according to one fitting function, followed by performing a touch position mapping on vertical axis orientation according to another one fitting function, thereby determining a touch position on the display area of the display module 204 according to a mapping result of both horizontal axis orientation and vertical axis orientation. In the present embodiment, the difference between the fitting functions (i.e., the univariate cubic polynomial functions) respectively used for mapping the touch position on horizontal axis orientation and for mapping the touch position on vertical axis orientation lies in where the coefficients of the two fitting functions are different.

Figure 3:
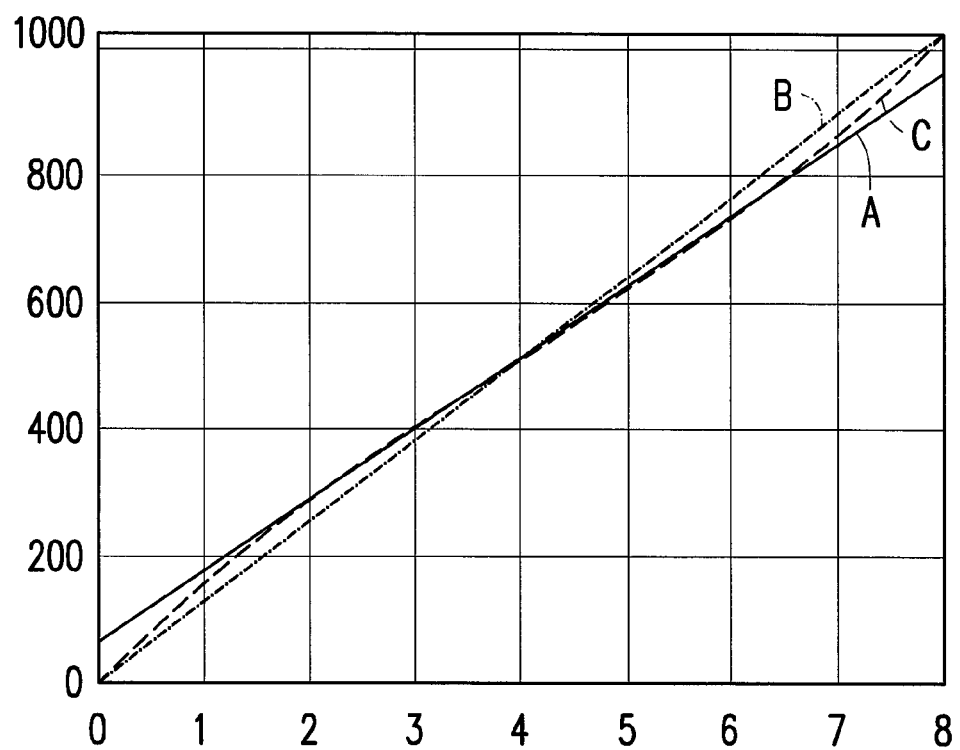
FIG. 3 is a schematic view illustrating a mapping of a touch position on horizontal axis orientation according to an embodiment of the invention.

FIG. 3 is a schematic view illustrating a mapping of a touch position on horizontal axis orientation according to an embodiment of the invention. Referring to FIG. 3, the horizontal axis of FIG. 3 represents a position of a touch-sensing line of the touch module 202 (in the present embodiment, the touch module 202 has nine touch-sensing lines on horizontal axis orientation), whereas the vertical axis represents a position of the pixel unit of the display module 204 (in the present embodiment, the display module has 1024 pixel units on horizontal axis orientation). A curve A is a corresponding position relation of the touch module 202 and the display module 204 in practical three-dimensional space, a curve B is an ideal position relation of the touch module 202 and the display module 204, and a curve C which uses a univariate cubic polynomial function is a fitting curve approaching to the curve B, in which the univariate cubic polynomial function is illustrated as follows:

$$Y = 1.333X^3 - 16X^2 + 170.67X + 7 \times 10^{-11} \quad (1)$$

In which X is the touch position on horizontal axis orientation detected by the touch module 202 and Y is a position corresponding to X on horizontal axis orientation of the display module 204.

As illustrated in FIG. 3, the relative relation of the touch position of the touch module 202 and the display module 204 may effectively approach to the curve C by using one univariate cubic polynomial function, and each position on the display area of the display module 204 has a corresponding touch position with a touch-sensing functionality.

Similarly, the mapping of the touch position on the vertical axis orientation may be performed by the same mapping method as used in the embodiment of FIG. 3. It should be noted that, since the number of the touch-sensing lines on vertical axis of the touch module 202 and the number of pixel units on the vertical axis of the display module 204 may be different from those mentioned in FIG. 3, a coefficient of the univariate cubic polynomial function may require adjustments in order to achieve a most preferable fitting result.

The storage unit 206 may store a plurality of univariate cubic polynomial functions having different coefficients, such that a curve fitting may be performed by selecting a proper fitting function based on the specification demanded by the system manufacturer.

Figure 4:
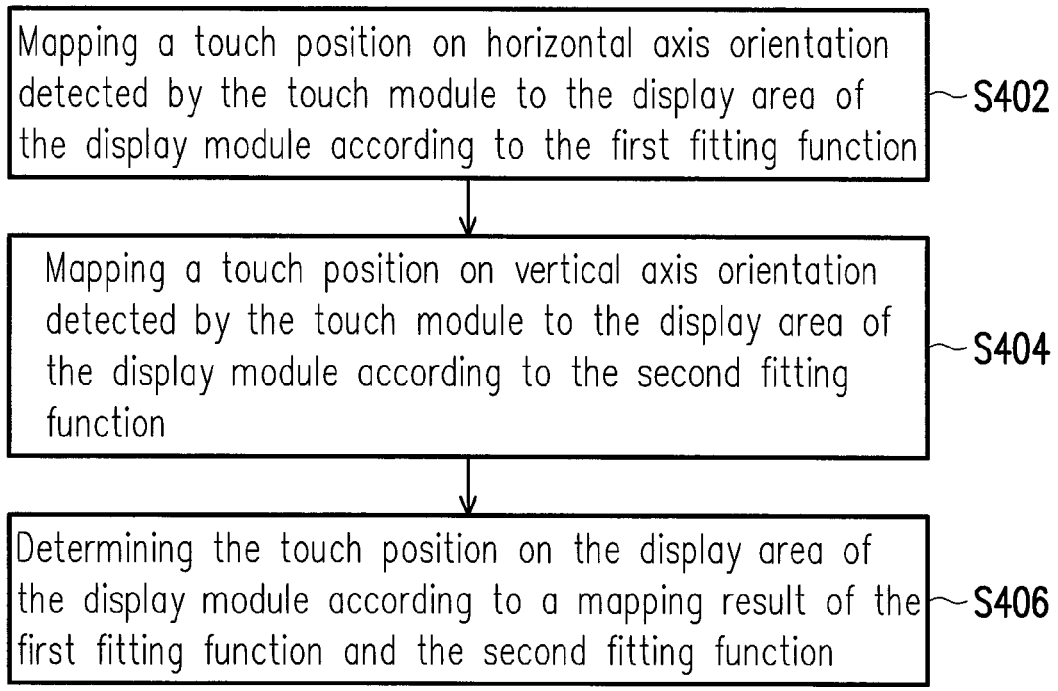
FIG. 4 is a flowchart illustrating a touch position mapping method of a touch display apparatus according to an embodiment of the invention.

FIG. 4 is a flowchart illustrating a touch position mapping method of a touch display apparatus according to an embodiment of the invention. In summary, the touch position mapping method of said touch display apparatus 200 may include the following steps. Firstly, mapping a touch position on horizontal axis orientation detected by the touch module to the display area of the display module according to the first fitting function (step S402). Next, mapping a touch position on vertical axis orientation detected by the touch module to the display area of the display module according to the second fitting function (step S404). Lastly, determining the touch position on the display area of the display module according to a mapping result of the first fitting function and the second fitting function (step S406).

In view of above, by mapping of the touch position according to one fitting function, the invention may accurately map the touch position detected by the touch module to the touch position on the display area of the display module, so that each position on the display area of the display module may have a touch-sensing functionality. In comparing to the mapping method which uses two ore more transfer functions in conventional art, the method of mapping the positions using one fitting function may reduce the degree of mapping error between a mapped position and an actual touch position, especially when the touch position falls on a boundary of the mapping areas defined by different transfer functions. The storage unit may store a plurality of univariate cubic polynomial functions, so that a curve fitting may be performed by selecting a proper fitting function based on the specification demanded by the system manufacturer.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed:
1. A touch display apparatus, comprising:
a touch module;

a display module, disposed to overlap with the touch module;

a storage unit, stored with at least a fitting function; and a control unit, coupled to the touch module, the display module and the storage unit, configured for mapping a touch position detected by the touch module to a display area of the display module according to one fitting function and determining a touch position on the display area of the display module according to a mapping result, wherein the fitting function has parameters X and Y, X is the touch position on horizontal axis orientation detected by the touch module, Y is a position corresponding to X on the horizontal axis orientation of the display module, and when X is increased, Y is increased.

2. The touch display apparatus of claim 1, wherein the fitting function is a univariate cubic polynomial function.

3. The touch display apparatus of claim 1, wherein the storage unit stores a first fitting function and a second fitting function, the control unit maps a touch position on horizontal axis orientation detected by the touch module to the display area of the display module according to the first fitting function and maps a touch position on vertical axis orientation detected by the touch module to the display area of the display module according to the second fitting function, thereby determining the touch position on the display area of the display module.

4. The touch display apparatus of claim 3, wherein the first fitting function and the second fitting function are univariate cubic polynomial functions.

5. The touch display apparatus of claim 1, wherein a touch area of the touch module is smaller than the display area of the display module.

6. A touch position mapping method of a touch display apparatus, adapted for mapping a touch position detected by a touch module to a touch position on a display area of a display module, comprising:

mapping a touch position on horizontal axis orientation detected by the touch module to the display area of the display module according to the first fitting function;

mapping a touch position on vertical axis orientation detected by the touch module to the display area of the display module according to the second fitting function, wherein the fitting function has parameters X and Y, X is the touch position on the horizontal axis orientation detected by the touch module, Y is a position corresponding to X on the horizontal axis orientation of the display module, and when X is increased, Y is increased; and determining the touch position on the display area of the display module according to a mapping result of the first fitting function and the second fitting function.

7. The touch position mapping method of the touch display apparatus of claim 6, wherein the first fitting function and the second fitting function are univariate cubic polynomial functions.

8. The touch position mapping method of the touch display apparatus of claim 6, wherein a touch area of the touch module is smaller than the display area of the display module.

* * * * *